United States Patent [19]

Fujikawa

[11] Patent Number: 5,706,787
[45] Date of Patent: Jan. 13, 1998

[54] ELECTROMAGNETIC FUEL INJECTION VALVE AND ATTACHMENT STRUCTURE THEREOF

[75] Inventor: Takuya Fujikawa, Saitama, Japan

[73] Assignee: Zexel Corporation, Japan

[21] Appl. No.: 585,477

[22] Filed: Jan. 16, 1996

[30] Foreign Application Priority Data

Jan. 25, 1995 [JP] Japan ................... 7-027681

[51] Int. Cl.[6] ............................................ F02M 37/04
[52] U.S. Cl. ...................... 123/470; 123/456; 277/213
[58] Field of Search ............................ 123/470, 472, 123/456, 509; 277/DIG. 6, DIG. 9, 213

[56] References Cited

U.S. PATENT DOCUMENTS

| | | | |
|---|---|---|---|
| 1,793,234 | 2/1931 | Mahler | 123/470 |
| 3,770,285 | 11/1973 | Grover | 277/DIG. 6 |
| 4,066,213 | 1/1978 | Stampe | 123/470 |
| 4,528,959 | 7/1985 | Hauser, Jr. | 123/470 |
| 4,589,596 | 5/1986 | Stumpp | 123/470 |
| 5,022,661 | 6/1991 | Nakasone | 297/213 |
| 5,125,383 | 6/1992 | Meier | 123/470 |
| 5,345,913 | 9/1994 | Belshaw | 123/470 |

FOREIGN PATENT DOCUMENTS

| | | | |
|---|---|---|---|
| 0186663 | 11/1982 | Japan | 297/213 |
| 1892998 | 1/1990 | U.S.S.R. | 277/213 |
| 813964 | 4/1960 | United Kingdom | 277/213 |
| 2144518 | 3/1985 | United Kingdom | 277/DIG. 6 |

*Primary Examiner*—Carl S. Miller
*Attorney, Agent, or Firm*—Ostrolenk, Faber, Gerb & Soffen, LLP

[57] ABSTRACT

An object is to provide an electromagnetic fuel injection valve 30 and an attachment structure thereof that satisfy the required sealing performance, heat resistance, and pressure resistance for an engine with a cylinder injection system, and with which it is possible to minimize the change in the amount of lift L of the needle valve 10 originating in distortion caused by attachment load.

Attention was focused on the sealing of the area in close proximity to the cylinder 39 where the electromagnetic fuel injection valve 30 is attached, and of the area away from this area of close proximity, and as a result, the present invention has a first sealing portion 44, in which a first gasket (the corrugated washer 46) is positioned at a location close to the cylinder 39 between the electromagnetic fuel injection valve and the cylinder head, and a second sealing portion, in which a second gasket (the plate washer 48) is positioned at a location further away from the cylinder 39 than this first sealing portion 44 between the electromagnetic fuel injection valve and the cylinder head.

19 Claims, 3 Drawing Sheets

016; ELECTROMAGNETIC FUEL INJECTION VALVE AND ATTACHMENT STRUCTURE THEREOF

BACKGROUND OF THE INVENTION

1. Field of the Invention

The present invention relates to an electromagnetic fuel injection valve and attachment structure thereof, and more particularly to an electromagnetic fuel injection valve in a cylinder injection system, and to an attachment structure thereof.

2. Description of the Related Art

Conventional electromagnetic fuel injection valves used for so-called low-pressure injection are attached to the intake manifold of the engine, and inject gasoline or other fuel into this intake manifold. Such a valve will be described through reference to FIG. 5.

FIG. 5 is a cross section of the above-mentioned conventional electromagnetic fuel injection valve 1. The electromagnetic fuel injection valve 1 has a connector 2, a valve housing 3, a nozzle cover 4, a fuel supply pipe 5 made of a magnetic material, a spring seat 6, a valve seat 7, and an electromagnetic coil 8 that is magnetized and demagnetized by a control signal from the connector 2.

A cylindrical armature 9 and a needle valve 10 that moves integrally with this cylindrical armature 9 are provided in the lower portion (in the figure) facing the fuel supply pipe 5.

An injection hole 11 is formed in the tip of the valve seat 7, and the needle valve 10 is constantly energized in the direction of this injection hole 11 by a valve spring 12 and seated on the seat portion 7A of the valve seat 7.

Gasoline or another such fuel is supplied from the upper portion (in the figure) of the fuel supply pipe 5 to a first fuel passage 13, and reaches the injection hole 11 after going from the first fuel passage 13 through a second fuel passage 14 inside the armature 9 and through a third fuel passage 15 between the valve seat 7 and the needle valve 10.

The interval between the stepped portion of the needle valve 10 and a valve stopper 16 is termed the lift amount L of the needle valve 10. The magnetization of the electromagnetic coil 8 results in the armature 9 and the needle valve 10 being integrally lifted against the energizing force of the valve spring 12, and in the fuel being injected from the injection hole 11 into the intake manifold 17 of the engine.

The demagnetization of the electromagnetic coil 8 results in the armature 9 and the needle valve 10 being returned to their original positions by the energizing force of the valve spring 12, and in the injection hole 11 being closed.

A structure for attaching the electromagnetic fuel injection valve 1 so configured to the intake manifold 17 involves applying a load in the intake manifold 17 direction by means of a fuel rail 20 via a first insulator 18 and a second insulator 19 made of NBR (nitrile butadiene rubber) or the like, and attaching said valve to the attachment hole 21 thereof.

However, in a so-called cylinder injection system, in which the electromagnetic fuel injection valve is attached to the cylinder head of the engine and injects high-pressure fuel directly into the cylinder, the valve is exposed to the combustion gas from the high-pressure cylinder because it must inject fuel into the cylinder, unlike the low pressure type of electromagnetic fuel injection valve 1 discussed above, and as a result, the following conditions must be satisfied in the attachment of such a high pressure type of electromagnetic fuel injection valve.

The first requirement is that since a high pressure type of electromagnetic fuel injection valve is attached to the cylinder head and the nozzle tip thereof is exposed to the inside of the cylinder, the attachment structure must be able to withstand the combustion pressure, the attachment structure must be vibration resistant because a great deal more vibration accompanies combustion than with an injection valve of the type that is attached to the manifold as shown in FIG. 5, there must be a good seal against combustion gas, and the heat radiation must be good so that the change in the amount of lift caused by thermal distortion can be minimized.

The second requirement is that the change in the amount of lift caused by the attachment load on the electromagnetic fuel injection valve be within a permissible range.

The third requirement is that since there are other structural components around the electromagnetic fuel injection valve, such as a water jacket (not shown), the attachment structure that is used to satisfy the above requirements must have external dimensions that are as small as possible.

Thus, the problem with conventional attachment structures for the electromagnetic fuel injection valve 1 was that it was extremely difficult to satisfy all of the above requirements at the same time.

SUMMARY OF THE INVENTION

The present invention was conceived in light of the above problems, and an object thereof is to provide an electromagnetic fuel injection valve and an attachment structure thereof that satisfy the various conditions listed above that are required by an engine with a cylinder injection system.

Another object of the present invention is to provide an electromagnetic fuel injection valve and an attachment structure thereof with which it is possible to minimize the change in the amount of lift of the needle valve caused by distortion of the electromagnetic fuel injection valve as a result of the load placed on the electromagnetic fuel injection valve during its attachment.

Still another object of the present invention is to provide an electromagnetic fuel injection valve and an attachment structure thereof with which it is possible to prevent the leakage of fuel (gasoline) from the attached electromagnetic fuel injection valve into the atmosphere.

Specifically, the present invention is the result of focusing attention on the sealing of the area in close proximity to the cylinder where the electromagnetic fuel injection valve is attached, and of the area away from this area of close proximity. The first invention is an attachment structure for an electromagnetic fuel injection valve, in which an electromagnetic fuel injection valve, which has a valve housing, an electromagnetic coil provided to this valve housing, an armature that responds to the magnetization of this electromagnetic coil, a valve seat in which a fuel injection hole is formed, a nozzle holder that fixes this valve seat, and a needle valve with which it is possible to inject fuel from the above-mentioned injection hole into the cylinder of an engine as a result of lift from the seat portion of the above-mentioned valve seat along with the above-mentioned armature in accordance with the magnetization of the above-mentioned electromagnetic coil, is attached to an attachment hole in the cylinder head of the engine; wherein this attachment structure for an electromagnetic fuel injection valve further comprises a first sealing portion, in which a first gasket is positioned at a location in the attachment hole in the above-mentioned cylinder head close to the above-mentioned cylinder between the electromagnetic fuel injection valve and the cylinder head, and a second sealing portion, in which a second gasket is positioned at a location further away from the above-mentioned cylinder than this first sealing portion between the electromagnetic fuel injection valve and the cylinder head.

The second invention is an electromagnetic fuel injection valve having a valve housing, an electromagnetic coil provided to this valve housing, an armature that responds to the magnetization of this electromagnetic coil, a valve seat in which a fuel injection hole is formed, a nozzle holder that fixes this valve seat, and a needle valve with which it is possible to inject fuel from the above-mentioned injection hole into the cylinder of an engine as a result of lift from the seat portion of the above-mentioned valve seat along with the above-mentioned armature in accordance with the magnetization of the above-mentioned electromagnetic coil; wherein this electromagnetic fuel injection valve further comprises the provision of a first sealing portion, in which a first gasket is positioned at a location in the attachment hole in the above-mentioned cylinder head close to the above-mentioned cylinder between the electromagnetic fuel injection valve and the cylinder head, and a second sealing portion, in which a second gasket is positioned at a location further away from the above-mentioned cylinder than this first sealing portion between the electromagnetic fuel injection valve and the cylinder head, and the positioning of the junction between the above-mentioned valve housing and the above-mentioned nozzle holder more toward the above-mentioned cylinder than this second sealing portion.

The above-mentioned first gasket can have a corrugated cross section.

The above-mentioned first gasket can be made from stainless steel, copper, or one of these materials that has been given a Teflon coating.

Since a double seal structure consisting of a first sealing portion and a second sealing portion is employed in the electromagnetic fuel injection valve and the attachment structure thereof pertaining to the present invention, the combustion gas from inside the cylinder is sealed more reliably.

Furthermore, since the first sealing portion is provided close to the cylinder, while the second sealing portion is provided further away from the cylinder, more effective sealing performance is obtained.

In addition, since the junction between the valve housing and the nozzle holder of the electromagnetic fuel injection valve is positioned more toward the nozzle tip (toward the cylinder) than is the second sealing portion, even in the event that a fuel leak from this junction should occur, leakage of the fuel from the electromagnetic fuel injection valve to the outside can be prevented by the second sealing portion.

In particular, if the first gasket that constitutes the first sealing portion is given a corrugated cross section, the elastic force thereof will allow a further increase in sealing performance, and it will also be possible to achieve a nearly constant attachment load over a specific stroke range of displacement due to tightening for the purpose of attachment, which allows the amount of lift of the needle valve to be kept within a permissible range.

DESCRIPTION OF THE PREFERRED EMBODIMENTS

The electromagnetic fuel injection valve and the attachment structure thereof pertaining to one embodiment of the present invention will now be described through reference to FIGS. 1 through 4. Those components that are the same as in FIG. 5 are labeled the same, and their detailed description will be omitted here.

Figure 1:
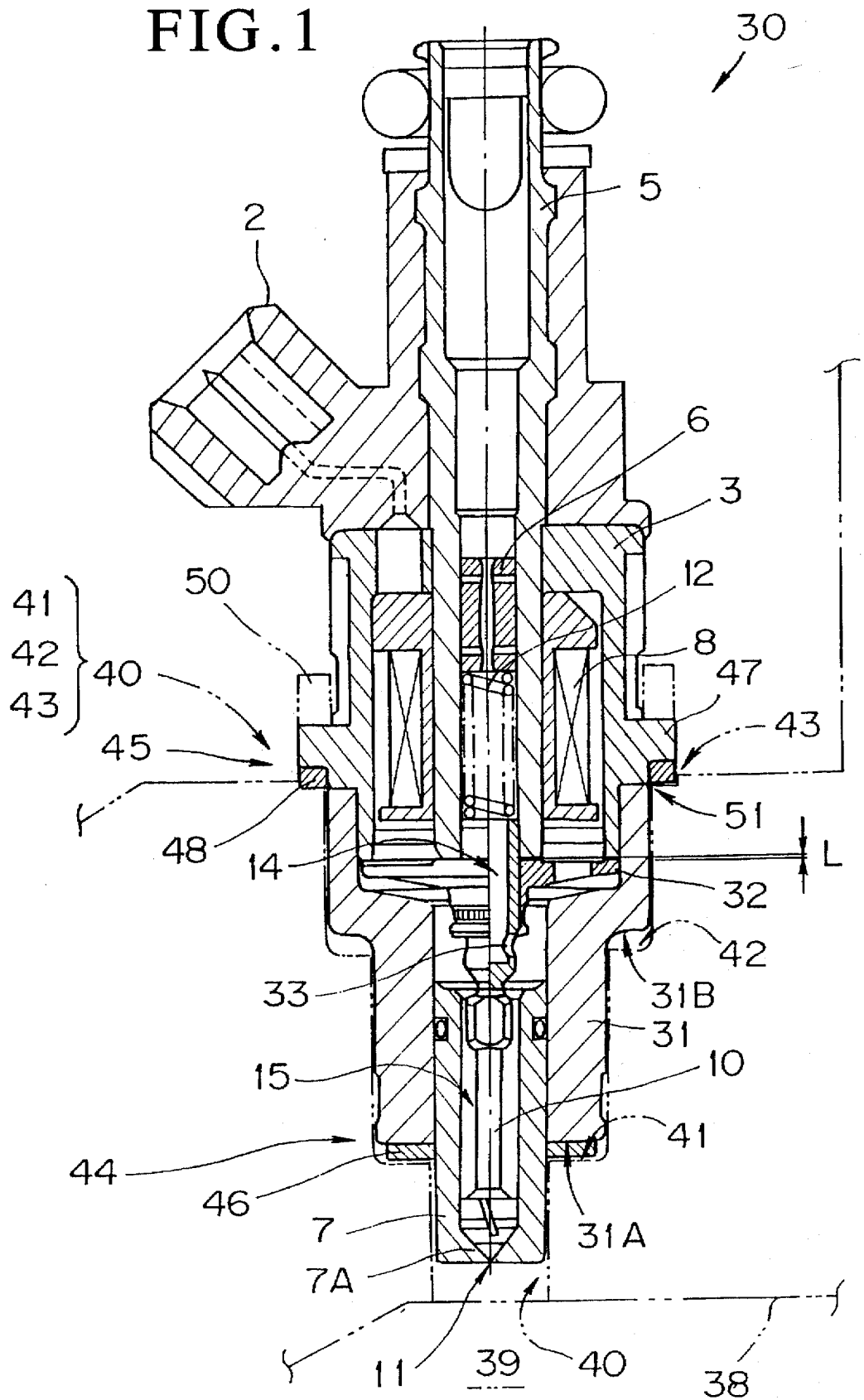
FIG. 1 is a cross section used to illustrate the electromagnetic fuel injection valve 30 and the attachment structure thereof pertaining to one embodiment of the present invention.

FIG. 1 is a cross section of an electromagnetic fuel injection valve 30. This electromagnetic fuel injection valve 30 has a nozzle holder 31, and a valve seat 7 is fixed to this nozzle holder 31.

It also has a plate-form armature 32 that corresponds to the above-mentioned armature 9, and the needle valve 10 moves integrally with this armature 32.

A communication hole 33 that communicates the second fuel passage 14 and the third fuel passage 15 is formed in the needle valve 10.

The amount of lift L of the needle valve 10 is set by means of the spacing between the armature 32 and the fuel supply pipe 5.

A cylinder 39 (which the injection hole 11 faces) and an injection valve attachment hole 40 are formed in the cylinder head 38 to which the electromagnetic fuel injection valve 30 is attached, and a first attachment setback 41, a second attachment setback 42, and a third attachment setback 43 with successively greater opening diameters in the direction going away from the cylinder 39 are formed in the injection valve attachment hole 40.

The first sealing portion 44 is located at the first attachment setback 41 of the cylinder head 38, and the second sealing portion 45 is located at the third attachment setback 43 of the cylinder head 38.

Specifically, a corrugated washer 46 is provided as the first gasket between the front surface 31A of the nozzle holder 31 and the first attachment setback 41.

The setback 31B of the nozzle holder 31 is opposite the second attachment setback 42.

A plate washer 48 is provided as the second gasket between the third attachment setback 43 and the attachment flange 47 of the valve housing 3.

Figure 2:
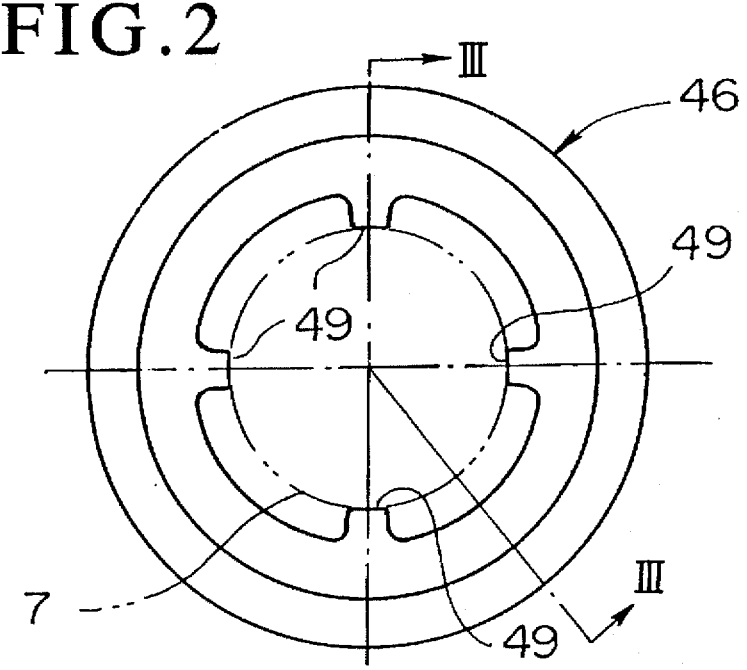
FIG. 2 is a plan view of a corrugated washer 46 in the same.
Figure 3:
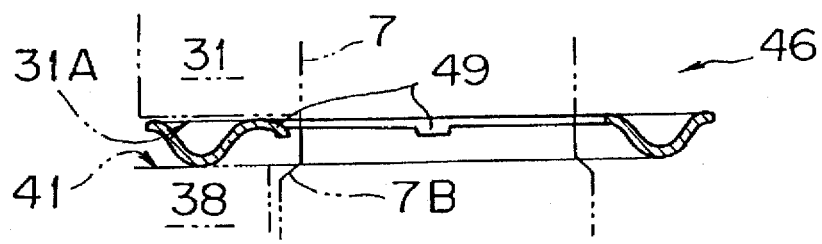
FIG. 3 is a cross section along the III—III line in FIG. 2 for the same.

FIG. 2 is a plan view of the corrugated washer 46. FIG. 3 is a cross section along the III—III line in FIG. 2. The corrugated washer 46 has a corrugated cross section, and the high points of this corrugated portion come into contact with the first attachment setback 41 of the cylinder head 38 and with the front surface 31A of the nozzle holder 31, forming sealing portions at each.

Also, protruding portions 49 that protrude radially from the center are in contact with the setback 7B of the valve seat 7, which prevents the corrugated washer 46 from falling out.

As to the material of which the corrugated washer 46 is made, complete sealing will be achieved if inconel, which is used in aircraft and the like, is subjected to silver plating as a surface treatment, but since this is unfeasible from a cost standpoint, an inexpensive stainless steel material (such as SUS 304) or copper material, or any one of these materials that has been coated with Teflon, should be used.

The combustion gas that infiltrates directly from the cylinder 39 at a specific pressure is sealed in by this corrugated washer 46, and the combustion pressure is reduced at the first sealing portion 44.

The plate washer 48 is used to make complete the seal provided by the first sealing portion 44, and ensures sealing further away than the first sealing portion 44 (at the second sealing portion 45, which is located further away from the injection hole 11).

Specifically, the attachment flange 47 of the valve housing 3 is pressed by an attachment fork 50 and bolted down (not shown) at a specific tightening force, which ensures a specific seal at the first sealing portion 44 and the second sealing portion 45.

An aluminum material that is the same material is the cylinder head 38 is preferable as the material for the plate washer 48.

Figure 4:
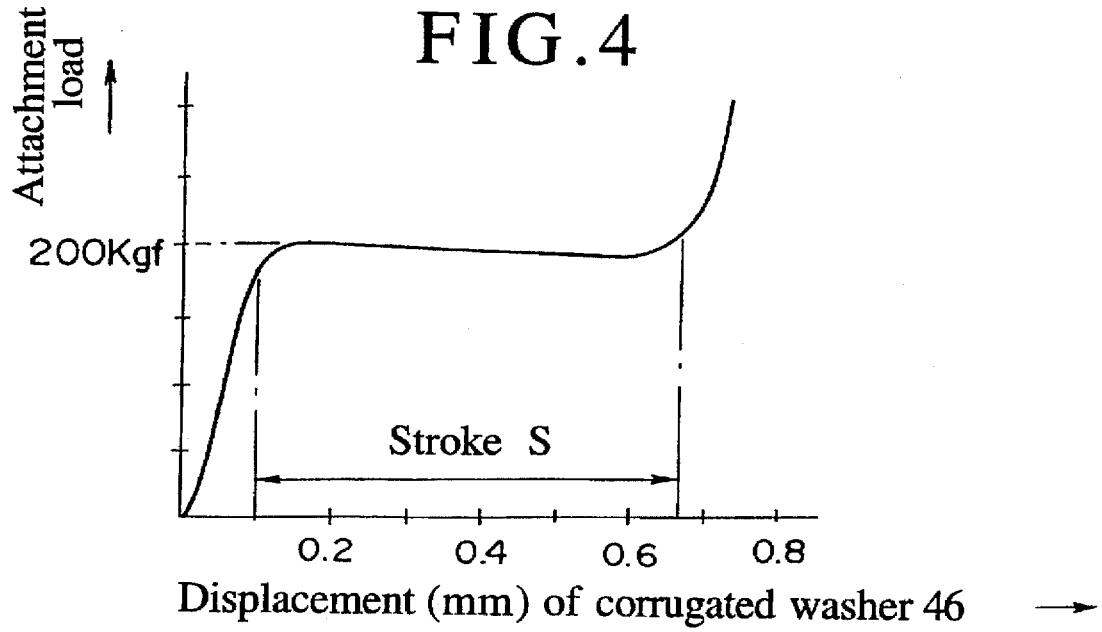
FIG. 4 is a graph of the relation of attachment load to the displacement of the corrugated washer 46 as a result of a specific tightening force for the same (stroke-load characteristics)
Figure 5:
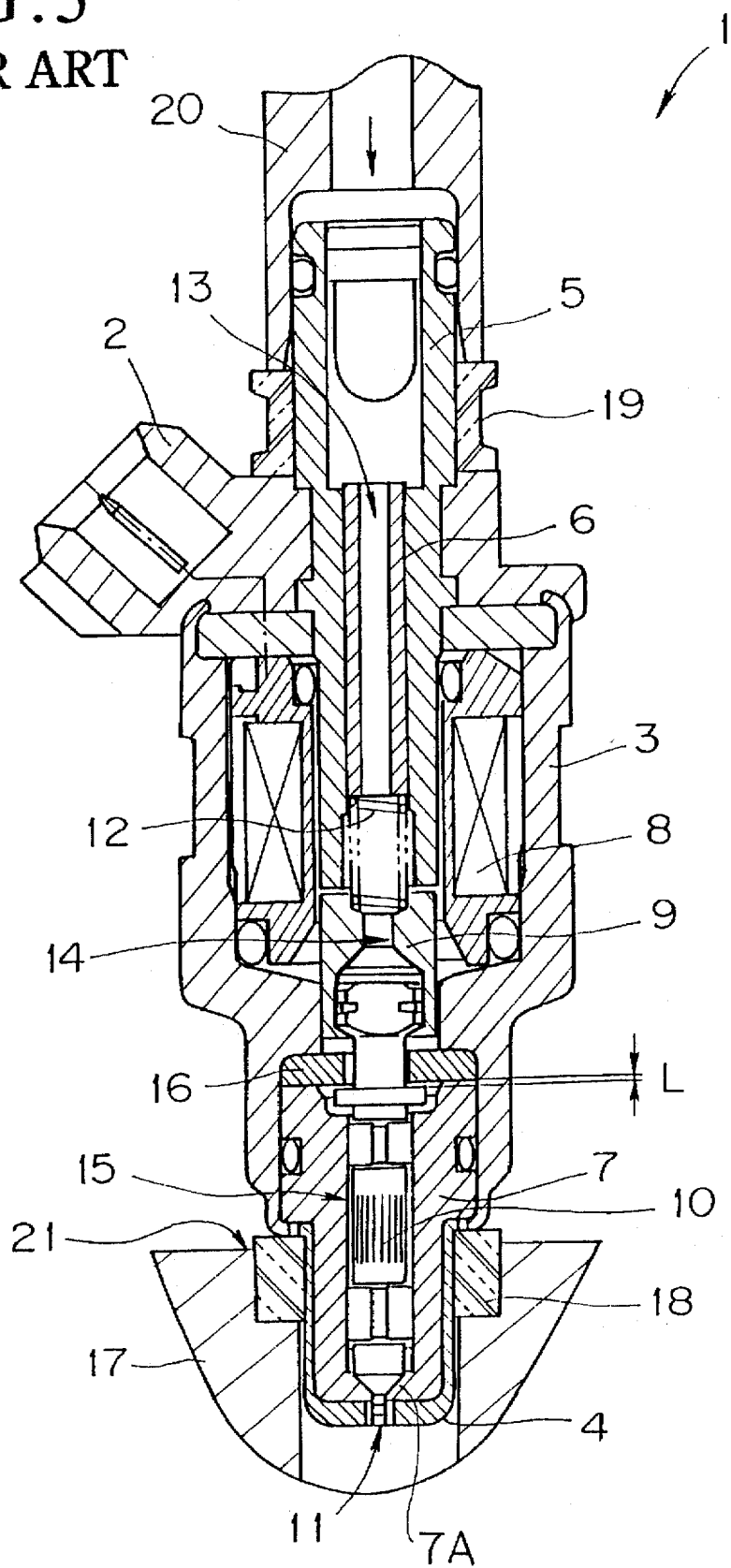
FIG. 5 is a cross section of a conventional electromagnetic fuel injection valve 1.

FIG. 4 is a graph of the relation of the attachment load to the displacement of the corrugated washer 46 by the above-mentioned tightening force (stroke-load characteristics). With the range of stroke S, the load remains fairly constant, and within this range of attachment load, there can be some latitude in the working tolerance settings of the electromagnetic fuel injection valve 30 and the cylinder head 38, and the change in the amount of lift L of the needle valve 10 will be within a permissible range, so the second requirement mentioned above can be met.

Specifically, the attachment load within the range of the tightening stroke S of the corrugated washer 46 is 200 kgf, for example, this load corresponds to a change of 2 μm in the amount of lift L, and this change of 2 μm is within the permissible tolerance range for the lift L.

Furthermore, the corrugated washer 46 (first gasket) is provided between the front surface 31A of the nozzle holder 31 and the first attachment setback 41 of the injection valve attachment hole 40, and the plate washer 48 (second gasket) is provided between the attachment flange 47 of the valve housing 3 and the third attachment setback 43 of the injection valve attachment hole 40, and since this is all that is needed, the third requirement mentioned above (namely, that the external dimensions of the nozzle be as small as possible) can be met.

The junction 51 between the valve housing 3 and the nozzle holder 31 is integrated by laser welding or the like, and this junction 51 is provided in the direction of the injection hole 11 from the sealing surface of the second sealing portion 45.

With the electromagnetic fuel injection valve 30 having an attachment structure such as this, the combustion gas from inside the cylinder 39 that accompanies engine drive is reduced in pressure in the corrugated washer 46 portion of the first sealing portion 44.

The minute amount of combustion gas that passes through the first sealing portion 44 is completely sealed off by the plate washer 48 of the second sealing portion 45.

Therefore, the first requirement mentioned above, namely, good combustion gas pressure resistance, vibration resistance, sealing performance, thermal radiation, and so on, can be met.

Finally, since the junction 51 between the valve housing 3 and the nozzle holder 31 is provided toward the injection hole 11 (on the cylinder 39 side) from the sealing surface of the second sealing portion 45, even if a gasoline leak should occur at this junction 51, a seal can still be achieved at the second sealing portion 45, so gasoline from the electromagnetic fuel injection valve 30 can be prevented from being released into the atmosphere.

As described above, with the present invention, a double seal construction consisting of a first sealing portion and a second sealing portion is provided, which allows the reliable attachment of an electromagnetic fuel injection valve with superior sealing performance, heat resistance, pressure resistance, and so on corresponding to a cylinder injection system.

What is claimed is:

1. An attachment structure for an electromagnetic fuel injection valve, wherein the electromagnetic fuel injection valve is of the type having:

a valve housing;

an electromagnetic coil provided to the valve housing;

an armature that responds to magnetization of the electromagnetic coil;

a valve seat in which a fuel injection hole is formed;

a nozzle holder that fixes the valve seat; and a needle valve for injecting fuel from the injection hole into a cylinder of an engine as a result of lift from a seat portion of the valve seat of the needle valve and the armature by magnetization of the electromagnetic coil, the attachment structure being attachable to an attachment hole in a cylinder head of the engine; the attachment structure for the electromagnetic fuel injection valve comprising:

a first sealing portion, in which a first gasket is positioned at a location in the attachment hole in the cylinder head close to the cylinder between the electromagnetic fuel injection valve and the cylinder head; and a second sealing portion, in which a second gasket is positioned at a location further away from the cylinder than the first sealing portion between the valve housing of the electromagnetic fuel injection valve and the cylinder head.

2. An attachment structure for an electromagnetic fuel injection valve, wherein the electromagnetic fuel injection valve is of the type having:

a valve housing;

an electromagnetic coil provided to the valve housing;

an armature that responds to magnetization of the electromagnetic coil;

a valve seat in which a fuel injection hole is formed;

a nozzle holder that fixes the valve seat;

a needle valve for injecting fuel from the injection hole into a cylinder of an engine as a result of lift from a seat portion of the valve seat of the needle valve and the armature by magnetization of the electromagnetic coil, the attachment structure being attachable to an attachment hole in a cylinder head of the engine; and a first attachment setback, a second attachment setback, and a third attachment setback with successively greater opening diameters in a direction going away from the cylinder formed in the attachment hole; the attachment structure for the electromagnetic fuel injection valve comprising:

a first sealing portion, in which a first gasket is positioned at a location in the attachment hole in the cylinder head close to the cylinder between the electromagnetic fuel injection valve and the cylinder head; and a second sealing portion, in which a second gasket is positioned at a location further away from the cylinder than the first sealing portion between the valve housing of the electromagnetic fuel injection valve and the cylinder head.

3. The attachment structure for an electromagnetic fuel injection valve as claimed in claim 2, wherein the first sealing portion is located at the first attachment setback.

4. The attachment structure for an electromagnetic fuel injection valve as claimed in claim 2, wherein the second sealing portion is located at the third attachment setback.

5. The attachment structure for an electromagnetic fuel injection valve as claimed in claim 2, wherein the first gasket is provided between an end surface of the nozzle holder and the first attachment setback.

6. The attachment structure for an electromagnetic fuel injection valve as claimed in claim 2, wherein the setback of the nozzle holder is opposite the second attachment setback.

7. The attachment structure for an electromagnetic fuel injection valve as claimed in claim 2, wherein the second gasket is provided between the third attachment setback and the attachment flange of the valve housing.

8. The attachment structure for an electromagnetic fuel injection valve as claimed in claim 1, wherein the first gasket has a corrugated cross section.

9. The attachment structure for an electromagnetic fuel injection valve as claimed in claim 8, wherein the high points of the first gasket come into contact with the attachment hole and with the end surface of the nozzle holder, forming sealing portions at each.

10. An attachment structure for an electromagnetic fuel injection valve, wherein the electromagnetic fuel injection valve is of the type having:

a valve housing;

an electromagnetic coil provided to the valve housing;

an armature that responds to magnetization of the electromagnetic coil;

a valve seat in which a fuel injection hole is formed;

a nozzle holder that fixes the valve seat; and a needle valve for injecting fuel from the injection hole into a cylinder of an engine as a result of lift from a seat portion of the valve seat of the needle valve and the armature by magnetization of the electromagnetic coil, the attachment structure being attachable to an attachment hole in a cylinder head of the engine; the attachment structure for the electromagnetic fuel injection valve comprising:

a first sealing portion, in which a first gasket is positioned at a location in the attachment hole in the cylinder head close to the cylinder between the electromagnetic fuel injection valve and the cylinder head, protruding portions that protrude radially from a center portion of the first gasket being in contact with a setback of the valve seat, thereby preventing the first gasket from falling out; and a second sealing portion, in which a second gasket is positioned at a location further away from the cylinder than the first sealing portion between the valve housing of the electromagnetic fuel injection valve and the cylinder head.

11. The attachment structure for an electromagnetic fuel injection valve as claimed in claim 1, wherein the first gasket is composed of a material selected from among stainless steel materials, copper materials, and any one of these materials that has been coated with Teflon.

12. The attachment structure for an electromagnetic fuel injection valve as claimed in claim 1, wherein the second gasket is composed of an aluminum material.

13. The attachment structure for an electromagnetic fuel injection valve as claimed in claim 1, wherein the first gasket allows an attachment load on the electromagnetic fuel injection valve to be fairly constant with respect to displacement over a specific range.

14. The attachment structure for an electromagnetic fuel injection valve as claimed in claim 1, wherein the first gasket is a corrugated washer.

15. The attachment structure for an electromagnetic fuel injection valve as claimed in claim 1, wherein the second gasket is the plate washer.

16. An electromagnetic fuel injection valve structure comprising:

a valve housing;

an electromagnetic coil provided to this valve housing;

an armature that responds to the magnetization of this electromagnetic coil;

a valve seat in which a fuel injection hole is formed;

a nozzle holder that fixes this valve seat, a needle valve with which it is possible to inject fuel from the injection hole into the cylinder of an engine as a result of lift from the seat portion of the valve seat along with the armature in accordance with the magnetization of the electromagnetic coil wherein the electromagnetic fuel injection valve structure further comprises:

a first sealing portion, in which a first gasket is positioned at a location in the attachment hole in the cylinder head of the engine close to the cylinder;

a second sealing portion, in which a second gasket is positioned at a location away from the cylinder; and a junction between the valve housing and the nozzle holder more toward the cylinder than this second sealing portion.

17. The electromagnetic fuel injection valve structure as claimed in claim 16, wherein the junction is integrated by means of laser welding.

18. An electromagnetic fuel injection valve structure comprising:

a valve housing;

an electromagnetic coil provided to the valve housing;

an armature that responds to the magnetization of the electromagnetic coil;

a valve seat in which a fuel injection hole is formed;

a nozzle holder that fixes the valve seat;

a needle valve for injecting fuel from the injection hole into a cylinder of an engine as a result of lift from a seat portion of the valve seat of the needle valve and the armature by magnetization of the electromagnetic coil;

a first sealing portion, in which a first gasket is positioned at a location in the attachment hole in the cylinder head of the engine close to the cylinder;

a second sealing portion, in which a second gasket is positioned at a location away from the cylinder; and a junction between the valve housing and the nozzle holder more toward the cylinder than the second sealing portion.

19. The electromagnetic fuel injection valve structure as claimed in claim 18, wherein the junction is integrated by means of laser welding.

* * * * *